United States Patent [19]
Mitsui et al.

[11] Patent Number: 5,335,944
[45] Date of Patent: Aug. 9, 1994

[54] HOSE COUPLING STRUCTURE

[75] Inventors: Kenichi Mitsui; Isao Fukuzono, both of Inazawa, Japan

[73] Assignee: Toyoda Gosei Co., Ltd., Nishikasugai, Japan

[21] Appl. No.: 856,768

[22] Filed: Mar. 24, 1992

[30] Foreign Application Priority Data

Mar. 25, 1991 [JP] Japan ................................. 3-059233
Oct. 14, 1991 [JP] Japan ................................. 3-265064

[51] Int. Cl.⁵ .............................................. F16L 41/00
[52] U.S. Cl. ..................................... 285/156; 285/239; 285/292; 285/371; 285/423
[58] Field of Search .................. 285/256, 423, 8, 234, 285/21, 371, 292, 114, 149

[56] References Cited

U.S. PATENT DOCUMENTS

| | | |
|---|---|---|
| 2,314,315 | 3/1943 | Scheele . |
| 3,291,507 | 12/1966 | Clay ................................. 285/114 |
| 4,258,935 | 3/1981 | Rodrigo et al. .................. 285/423 X |
| 4,558,889 | 12/1985 | Gans ................................ 285/423 X |
| 4,718,700 | 1/1988 | Horch et al. ..................... 285/423 X |
| 4,790,573 | 12/1988 | Cardozo .......................... 285/423 X |
| 4,848,801 | 7/1989 | Grabowski ........................... 285/21 |
| 4,852,914 | 8/1989 | Lyall .................................... 285/21 |
| 4,955,970 | 9/1990 | Kivi .................................. 285/149 |
| 5,033,775 | 7/1991 | Matte ............................. 285/156 X |
| 5,060,983 | 10/1991 | Lee ................................ 285/423 X |

FOREIGN PATENT DOCUMENTS 0286973 10/1988 European Pat. Off. .
1523331 3/1967 France .

Primary Examiner—Dave W. Arola
Attorney, Agent, or Firm—Cushman, Darby & Cushman

[57] ABSTRACT

In order to easily automate the coupling work of a pipe and a hose without damaging the mechanical strength of the structure, a hose with a coupling portion includes a nipple, a hose inserted into the end portion of the nipple, and a resin covering portion integrally covering the coupled portion of the hose and the pipe, the hose being previously configured to include a general part having an inner diameter equal to that of the nipple, a first enlarged part having a diameter enlarged at the fore end of the general part, the inner diameter of the enlarged part being smaller than the outer diameter of the nipple, and a second enlarged part having an inner diameter which gradually increases starting from the fore end of the first enlarged part and becoming larger than the outer diameter of the nipple, the first and second enlarged parts being applied to the nipple.

8 Claims, 4 Drawing Sheets

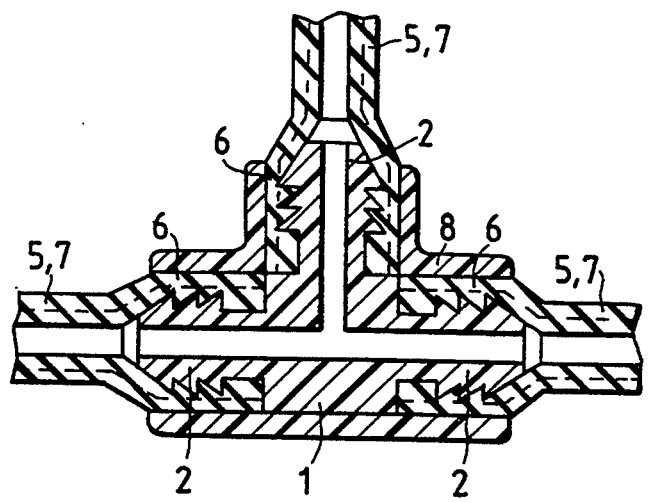
FIG. 1
PRIOR ART
PRIOR ART
FIG. 2
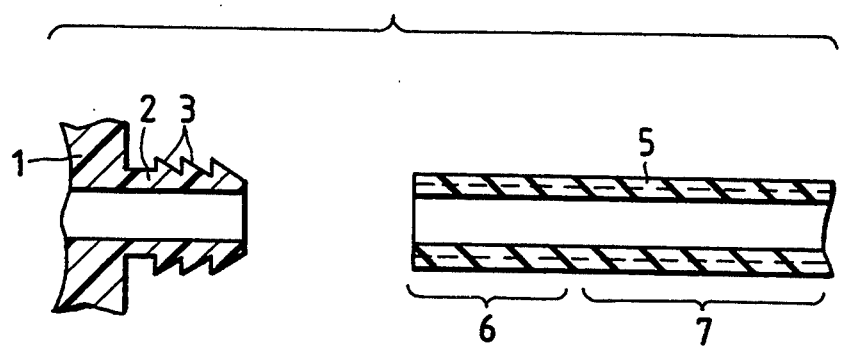

HOSE COUPLING STRUCTURE

BACKGROUND OF THE INVENTION

Field of the Invention

The present invention relates to a hose coupling structure for coupling hoses for cooling water in an internal combustion engine, for example. Generally, the structure has nipples, hoses each of which includes a coupling portion to be applied to the nipple, and mold portions covering the coupling portions coupled with the nipples. In fluid paths formed after the coupling portions of the hoses are coupled with the nipples, the inner diameter of each hose is substantially equal to that of each nipple.

Brief Description of Related Art

By convention, a hose coupling structure as shown in FIG. 1 has been employed for coupling hoses through which flows cooling water, for example, in an internal combustion engine. (see U.S. Pat. No. 5,033,775).

In the coupling structure, water hoses 5 are applied to three nipples 2 of a branch pipe 1, thereby to couple the hoses 5 with the nipples 2. Afterwards, the coupled portions are set to a prescribed mold, and are molded with mold portions 8 made of thermoplastic resin, thereby clamping them.

In the conventional hose coupling structure, as shown in FIG. 2, each of the hoses 5 have an inner diameter substantially equal to the inner diameter of the nipple 2 in order to secure the quantity of cooling water through each hose 5. This creates the following problem.

Where the inner diameter of the hose 5 is substantially equal to the inner diameter of the nipple 2, the inner diameter of the coupling portion 6 of the nipple 2 applied to the hose 5 is equal to the inner diameter of the remaining portion 7 of the hose 5, that is, other than the coupling portion 6. Therefore, to couple the coupling portion 6 with the nipple 2, a worker must expand the coupling portion 6 of the hose 5 so that the inner diameter of the coupling portion 6 is substantially equal to the outer diameter of the nipple 2, and forcibly apply the expanded coupling portion 6 to the nipple 2.

A series of ring-like ribs 3, each extending round each nipple 2, are formed on the outer surface of the nipple 2 in order to secure a reliable sealing at the coupled portion of the nipple and the coupling portion 6 of the hose 5. Presence of the ribs 3 hinders the smooth coupling of the nipple and hose. In a case where the branch pipe is made of metal, if the nipples are thin, no problem arises in the mechanical strength of the nipple against its thermal deformation, for example. In a case where the branch pipe is made of synthetic resin for the purpose of weight reduction, the nipple must be thick. The thick nipple makes it more difficult to couple the coupling portion of each hose with each nipple.

SUMMARY OF THE INVENTION

The present invention has been made to solve the above-mentioned problems and has an object to provide a hose coupling structure in which the coupling portions of hoses, after those are coupled with the nipples, are covered with mold portions, and in the fluid paths formed after those are coupled, the inner diameter of each hose is substantially equal to the inner diameter of each nipple of a branch pipe, the hose coupling structure being improved in that the coupling work for coupling the coupling portions and the nipples can be done in an easy manner by minimizing the clamping force of each coupling portion when it is applied to the nipple.

To achieve the above object, in a first aspect of the present invention, there is provided a hose coupling structure having nipples, hoses each including a coupling portion to be applied to the nipple, and mold portions covering the coupling portions coupled with the nipples, in which in fluid paths formed after the coupling portions of the hoses are coupled with the nipples, the inner diameter of each hose is substantially equal to that of each nipple, characterized in that in a structural state before the coupling portion of each hose is coupled with the nipple, the inner diameter of the coupling portion of each hose is larger than the inner diameter of the remaining portion of the hose but smaller than the outer diameter of each nipple.

In the thus constructed hose coupling structure of the present invention, the coupling portions of the hoses are coupled with the nipples by applying the former to the latter, and the mold portions are formed over the coupled portions thereof. Therefore, the coupling portions of the hoses can be coupled with the nipples of the branch pipe in a clamping state.

The inner diameter of each coupling portion is previously selected to be equal to or larger than the inner diameter of the remaining portion of the hose except the coupling portion, but is smaller than the outer diameter of the nipple. Therefore, in the hose coupling structure of the present invention, the hoses may be more easily coupled with the nipples than in the conventional hose coupling structure where the inner diameter of each coupling portion is substantially equal to that of the remaining portion.

After the hoses are coupled with the nipples of the branch pipe, the coupled portions are molded, thereby preventing the reduction of the clamping force of the coupling portions coupled with the nipples.

After the hoses are coupled with the nipples of the branch pipe, the inner diameter of the remaining portion of each hose becomes substantially equal to that of each nipple, thereby to secure a precise quantity of the liquid flowing through each fluid path between the hose and the nipple.

Thus, in the hose coupling structure of the first aspect of the invention in which after the coupling portions of the hoses are coupled with the nipples of the branch pipe, the coupled portions are covered with the mold portions, and in fluid paths formed after the coupling portions are coupled with the nipples in a clamping state, the inner diameter of each hose is substantially equal to that of each nipple. When the coupling portions are coupled with the nipples by applying the former to the latter, the coupling work can be easily done while minimizing the reduction of the clamping force of the coupling portion of each hose.

In addition, a second aspect of the present invention includes a hose with a coupling portion, a pipe, a hose inserted into the end portion of the pipe, and a resin covering portion integrally covering the coupled portion of the hose and the pipe, wherein the hose is previously configured so as to include a general part having the inner diameter equal to that of the pipe, a first enlarged part of the hose having a diameter enlarged at the fore end of the general part and an inner diameter smaller than the outer diameter of the pipe. A second enlarged part of the hose has a diameter which gradually increases starting from the fore end of the first enlarged part and the inner diameter is larger than the outer diameter of the pipe, the second enlarged part and the first enlarged part being applied to the pipe.

The pipe, when inserted into the hose, supports the hose with its coupling portion in a reinforcing manner, and may be a branch pipe having branched pipes extending in different directions. The fore end part of the pipe is inserted into the hose, and cooperates with a resin covering portion to be given later to nip the hose therebetween.

One of the most important features of the present invention resides in the configuration of the hose. The hose is previously configured so as to include a general part having its inner diameter equal to that of the pipe, a first enlarged part in which the inner diameter is enlarged at the fore end of the general part but is smaller than the outer diameter of the pipe, and a second enlarged part in which the inner diameter gradually increases starting from the fore end of the first enlarged part and is larger than the outer diameter of the pipe. The pipe may be easily inserted into the thus-configured hose when they are axially aligned and brought close to each other. This allows the insertion work of the pipe into the hose to be automated. The first enlarged part of the hose is applied to the pipe while being further enlarged. Accordingly, a further reliable sealing property is secured. The amount of enlargement of this part, when applied, is small when compared with the conventional case, and hence it will not create any problem of mechanical strength in the coupled portion.

The hose of such a configuration may be formed in a mold. The same may also be formed in a manner that a hose of the uniform diameter is formed by injection molding and the required portions of the formed hose are enlarged in diameter by using a mandrel with three steps of different diameters. The thus configured hose and the pipe may easily be coupled in a manner that either the hose or the pipe is fixed, and the remaining one is moved close to the fixed one.

The resin covering portion is formed covering the coupled portions of the hose and the pipe, and it cooperates with the pipe to nip the hose. The resin covering portion may be formed in a manner that the pipe coupled with the hose is set in a mold, and sealed with proper sealing means, and formed on the coupled portions by injection molding, for example.

In manufacturing the hose with the coupling portion according to the present invention, a hose is applied to a pipe. In this case, the second enlarged part of the hose is first applied to the pipe. Since the inner diameter of the second enlarged part is larger than the outer diameter of the pipe, when the hose and the pipe are axially aligned and relatively moved in close to each other, the pipe is smoothly inserted into the second enlarged part of the hose without abutting against the end face of the hose. The diameter of the second enlarged part gradually decreases toward the first enlarged part. Because of this, the pipe is guided along the funnel-shaped inner surface of the boundary between the second and first enlarged parts and inserted into the first enlarged part. Further, the inner diameter of the first enlarged part is smaller than the outer diameter of the pipe. Therefore, the pipe is inserted into the first enlarged part while forcibly expanding the first enlarged part. With a reaction force in the first enlarged part which acts to reduce the diameter of the first enlarged part, the pipe is tightly covered with the first enlarged part, thereby providing a reliable sealing property.

Thus, when the hose with the coupling portion according to the present invention is used, the hose and the pipe can be smoothly coupled with each other by merely axially aligning them and relatively moving them in close to each other in the axial direction. In this respect, the coupling work of the hose with the pipe may be automated. The fore end portion of the rubber hose is enlarged in diameter; however, this will not injure the beauty of its external appearance because the surface of the fore end portion is covered with resin.

BRIEF DESCRIPTION OF THE DRAWINGS

FIG. 1 is a cross sectional view showing a conventional hose coupling structure;

FIG. 2 is a sectional view showing a conventional branch pipe nipple and hose used for a conventional hose coupling structure;

DETAILED DESCRIPTION OF THE PREFERRED EMBODIMENT

Embodiments of a hose coupling structure according to the present invention will be described with reference to the accompanying drawings.

Figure 3:
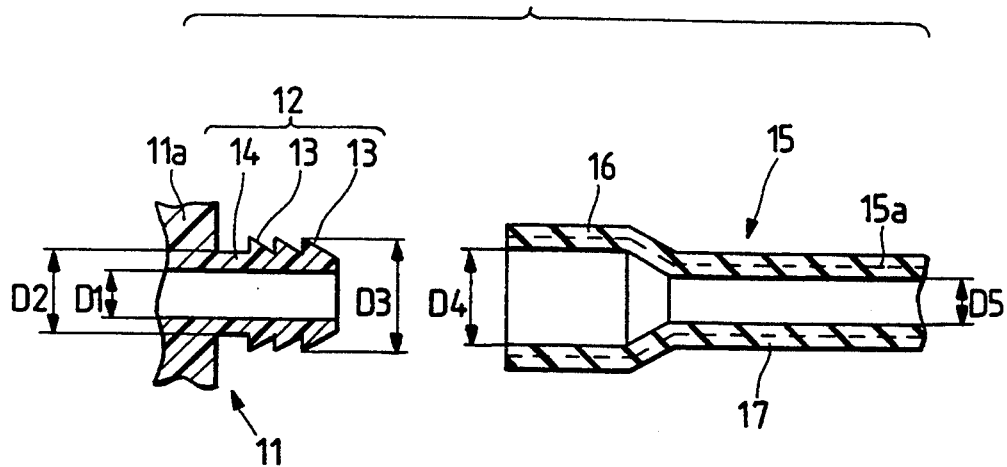
FIG. 3 is a sectional view showing a branch pipe nipple and hose in a hose coupling structure of a first embodiment of the present invention before those are coupled with each other.
Figure 4:
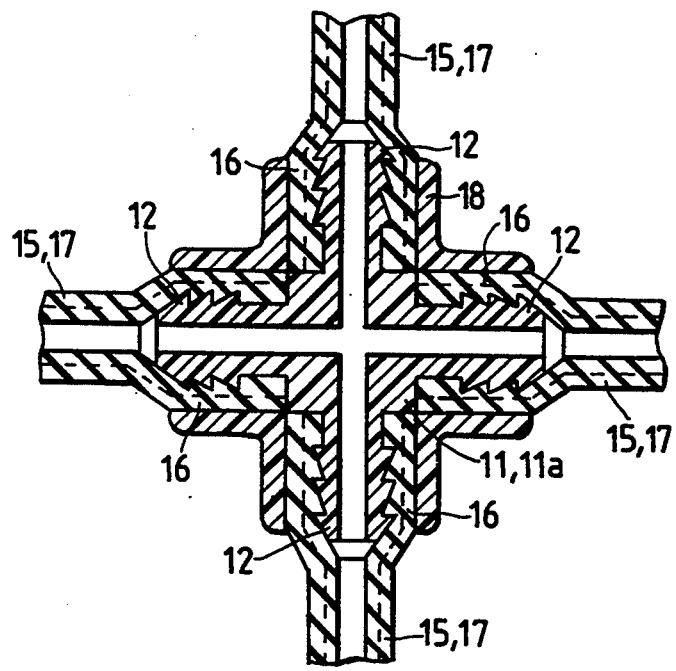
FIG. 4 is a cross sectional view showing the hose coupling structure of the embodiment after the hoses and the nipples of the branch pipe are coupled with each other.

In the hose coupling structure of a first embodiment of the present invention, as shown in FIGS. 3 and 4, water hoses 15 are coupled with the nipples 12 of a branch pipe 11 by applying the water hoses 15 to the nipples 12. Then, mold portions 18 are formed on the coupled portions of the hoses and the nipples 12.

The branch pipe 11 is made of synthetic resin, such as polyamide containing glass fibers. Each nipple 12 is provided with a plurality of ring ribs 13 each radially protruding from the outer surface of the nipple.

Each hose 15 is made of rubber, such as EPDM, and contains a central braided layer 15a. A coupling portion 16 of the hose 15 to be coupled with the nipple 12, as shown in FIG. 3, is previously expanded to have a larger diameter than that of the remaining portion 17 of the hose itself, that is, the portion of the hose except the coupling portion. The inner diameter D5 of the remaining portion 17 is equal to the inner diameter D1 of the nipple 12 to be coupled therewith.

In manufacturing each hose 15, a mandrel capable of forming the coupling portion 16 is inserted into a raw rubber hose (resembling the remaining portion 17 in configuration) containing a braided layer 15a therein.

The raw rubber hose with the mandrel inserted therein is vulcanized.

The inner diameter $D_4$ of each coupling portion 16 is smaller than the maximum outer diameter (the outer rib diameter, i.e., the outer diameter of each rib 13) $D_3$ of the nipple 12 with which the coupling portion is to be coupled.

In the present embodiment, the diameter $D_4$ of the coupling portion 16 is smaller than the maximum outer diameter $D_3$ of the nipple 12, but larger than the outer diameter $D_2$ of the portion 14 of the nipple where the ribs 13 are not formed or the diameter of the inner edge of the tapered face of the fore end of the nipple (the outer facial diameter). In the present embodiment, exemplary diameters are as follows: $D_1$ is 16.0 mm; $D_2$ 18.8 mm, $D_3$, 21.6 mm, $D_4$, 19.6 mm, and $D_5$, 16.0 mm.

In connection with the contraction percentage of the branch pipe 11, each mold portion 18 is made of synthetic resin, such as polyimide, which is the same material as that of the branch pipe.

How the hoses are coupled with the nipples of the branch pipe in the present embodiment in a clamping state will be described. As in the conventional hose coupling structure, the coupling portions 16 of the hoses 15 are respectively applied to the nipples 12 of the branch pipe 11, thereby coupling them. At this time, in order to increase the resistance by the ribs 13 which acts on the movement of the hose with respect to the nipple, each hose is applied to the nipple of the branch pipe and pushed until the coupling portion 6 reaches the main body 11a of the branch pipe 1.

Thereafter, the coupled portions of the coupling portions of the hoses and the nipples of the branch pipe are set in a prescribed mold, and mold portions 18 are formed on the coupled portions by an injection molding method, for example. As a result, the coupling portions 16 of the hoses 15 are coupled with the nipples 12 of the branch pipe, thereby clamping the latter.

As recalled, in the present embodiment, the inner diameter $D_4$ of each coupling portion 16 is larger than the inner diameter $D_5$ of the remaining portion 17 of the hose, viz., the portion of the hose other than the coupling portion 16, but is smaller than the maximum outer diameter $D_3$ of the nipple 12. Therefore, the operation for coupling of the coupling portion 16 of each hose with each nipple 12 of the branch pipe by applying the former to the latter may be more easily carried out than the corresponding operation in the conventional hose coupling structure in which the inner diameter of the coupling portion of the hose is substantially equal to the inner diameter of the remaining portion of the hose.

In the present embodiment, a force to push each hose 15 to apply it to the nipple 12 was ⅓ or less as large as that of the conventional hose coupling structure.

It is noted that the coupled portions of the coupling portions of the hoses 15 and the nipples 12 of the branch pipe are covered with the mold portions 18 after the coupling portions and the nipples are coupled with each other. With use of the mold portions 18, the clamping force of the coupling portions 16 to clamp the nipples 12 is little reduced. The clamping force in the present embodiment is reduced by 30% when compared with that of the conventional structure. However, the clamping force per se is 1.5 times as large as that of the conventional structure where the coupling portions 16 are coupled with the nipples 12 and fastened thereto by suitable clamping means, such as clamps. For this reason, the 30% reduction of the clamping force will not create any particular problem in practical use.

Particularly in the hose 15 containing a braided layer 15a therein, the coupling portion 16 is expanded in diameter in the vulcanizing process in the stage of manufacturing the hoses 15. Accordingly, in the coupling portion 16 vulcanized in the diameter expanded state, angles of reinforcing strings of the braided layer 15a (angles of the strings crossing the axial direction of the hose 15) are increased and under this condition, the hose is vulcanized. That is, the hose is vulcanized in a state that the stress to the contractive force of the braided layer 15a which tends to reduce the diameter of the hose, is generated in the coupling portion 16 of the hose. Accordingly, in the hose coupling structure after the coupling portions 16 are coupled with the nipples 12 in a clamping state, when a pressurized fluid flows through the fluid paths of the hoses 15, the tension of the reinforcing strings of the braided layers 15a in the remaining portions 17 of the hoses, act to restore the original string angles and hence to reduce the diameter of the coupling portion 16 of the hose, so that the clamping force of the coupling portion 16 to clamp the nipple 12 is further increased.

In the hose coupling structure after the coupling portions 16 are coupled with the nipples 12 in a clamping state, the inner diameter $D_5$ of the remaining portion 17 of each hose 15 is equal to the inner diameter $D_1$ of each nipple 12. Therefore, a precise quantity of cooling water flowing through the flow path of each nipple 12 can be secured, thereby obtaining the beneficial effects as already stated above.

In the hose coupling structure of the present embodiment before the inner diameter $D_4$ of the coupling portion 16 of each hose is coupled with the nipple 12, the diameter $D_4$ of the coupling portion 16 is smaller than the maximum outer diameter $D_3$ of the nipple 12, but is larger than the inner diameter $D_2$ of the portion 14 of the nipple where the ribs 13 are not formed or the diameter of the inner edge of the tapered face of the fore end of the nipple. However, the lower limit of the inner diameter $D_4$, which is allowed in the present embodiment, is equal to or larger than the inner diameter $D_5$ of the remaining portion 17. In the structure, like the structure of the present embodiment, where the lower limit of the inner diameter $D_4$ is larger than the outer diameter $D_2$ of the portion 14 of the nipple where the ribs 13 are not formed or the diameter of the inner edge of the tapered face of the fore end of the nipple, the coupling work of the coupling portions 16 with the nipples 12 will be more easily done.

The present embodiment thus far described is the hose coupling structure in which the hoses 15 are coupled with the four nipples 12 of the branch pipe 11 in a clamping state. It is evident to those skilled in the art that the number of nipples of the branch pipe is not limited to four, but may be five or more nipples, or less including a single nipple.

The nipples 12 of the branch pipe may be made of metal in place of synthetic resin, which is used in the above-mentioned embodiment.

A second embodiment of a hose with a coupling portion according to the present invention is now described with reference to FIGS. 5 and 6.

Figure 5:
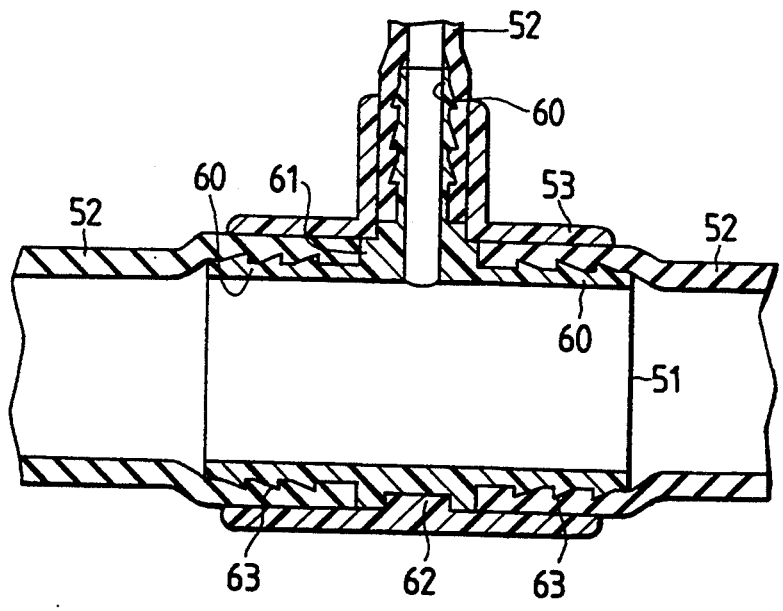
FIG. 5 is a cross sectional view showing a hose with a coupling portion according to a second embodiment of the present invention.
Figure 6:
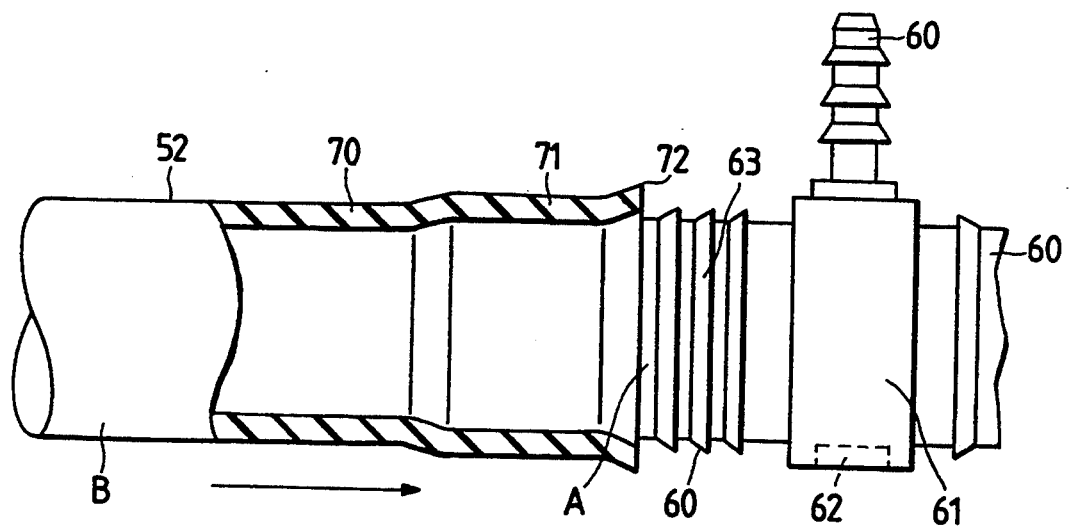
FIG. 6 is an explanatory diagram useful in explaining the coupling of the pipe and the hose of the present embodiment.

FIG. 5 is a cross sectional view showing a hose with a coupling portion of the present embodiment. The hose of the present embodiment is a branch hose used as a radiator hose.

The branch hose is comprised of a branch pipe 51 made of resin and having three branched pipes 60, three hoses 52 respectively applied to the branched pipes 60, and a resin covering portion 53 which covers the coupled portions of the branch pipe 51 and the hoses 52, and the central section 61 of the branch pipe 51, thereby fixing those components in an integral form.

The branch pipe 51 includes the thick central part 61, and the branched pipes 60 branched from the central part 61 in three directions. A stopper recess 62 is formed in the central part 61 for reasons described below. A plurality of ring-shaped protrusions or ribs 63, each extending round each branched pipe 60, are formed on the outer surface of each branched pipe, and serve as stoppers to prevent the hose 52 from being slipped from the pipe.

Each hose 52 includes a general part 70 of which the inner diameter is uniform over its length and an enlarged part which includes a first enlarged section 71 continuous from the fore end of the general part 70, and a second enlarged section 72 which flares outwardly, i.e., expands from the fore end of the first enlarged section 71 in a funnel fashion. The hose 52 is formed by inserting a mandrel with three steps of different diameters into a previously formed hose of a uniform diameter and vulcanizing it.

The branched pipe A and the hose B to be applied to the pipe A shown in FIG. 6 have exemplary dimensions as follows: the outer and inner diameters of the branched pipe A are 19.6 mm and 16 mm; the inner diameter of the general part 70 is 16 mm; the inner diameter of the first enlarged section 71 is 17.5 mm; and the inner diameter of the fore end of the second enlarged section 72 is 20 mm. Thus, the inner diameter of the first enlarged section 71 is smaller than the outer diameter of the branched pipe A, and the inner diameter of the second enlarged section 72 is larger than the outer diameter of the branched pipe A.

When the hose B is applied to the branched pipe A, a hold jig (not shown) is set to the stopper recess 62 thereby fixing the branch pipe 51. Then, the branched pipe A and the hose B are axially aligned with each other and the hose B is moved close to the branched pipe A in the axial direction, with the second enlarged section 72 in the lead. The branched pipe A is easily inserted into the second enlarged section 72 of the hose since the inner diameter of the second enlarged section 72 is larger than the outer diameter of the branched pipe A. Then, the branched pipe A is guided along the funnel-shaped inner surface of the second enlarged section 72 and inserted into the first enlarged section 71. In this case, the branched pipe A is put into the first enlarged section 71 while expanding the first enlarged section 71, until it comes in contact with the central section 62 of the hose B. The same thing is correspondingly applied to the inserting work of the remaining pipes 60 and hoses 52.

With presence of the second enlarged section 72, the fore end face of the hose 52 will not abut against the fore end face of the branched pipe 60. Therefore, the inserting work of the pipe into the hose may be automated. Since the first enlarged section 71 is previously expanded in diameter, the amount of its expansion when the inserting work is done is small when compared with the conventional case. Accordingly, the amount of deformation of the first enlarged section 71 is small, so that reduction of its thickness is small and the amount of deformation of the reinforcing string layer is also small. Consequently, the mechanical strength of the structure is little influenced adversely by the inserting or coupling work.

Figure 8:
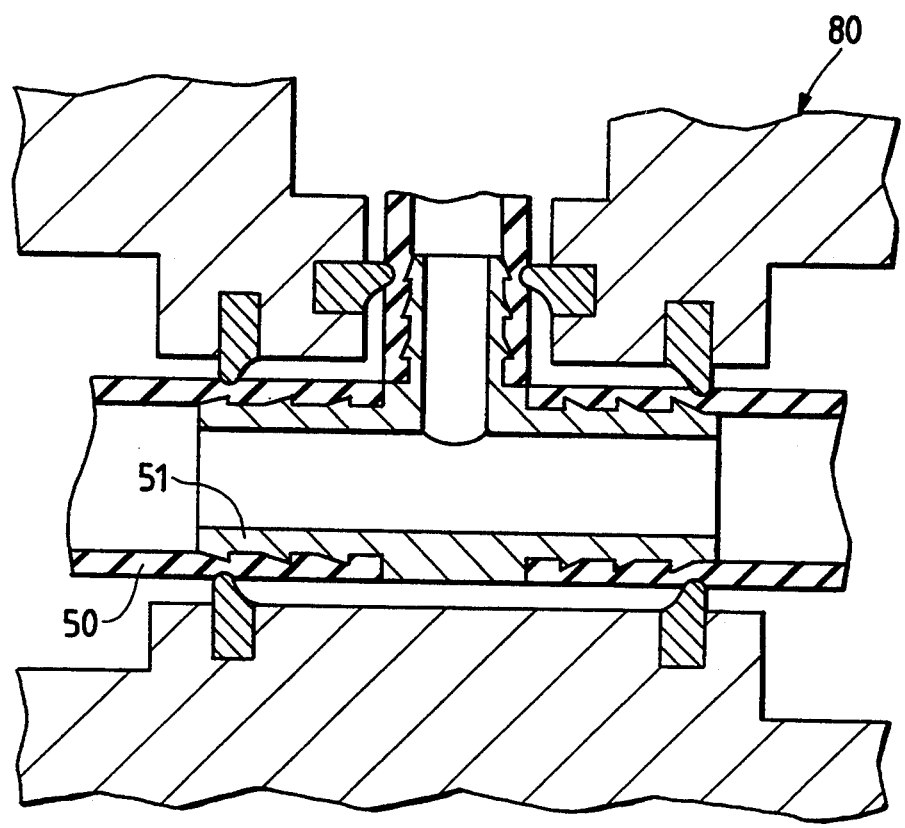
FIG. 8 is an explanatory diagram useful in explaining the manufacturing process of the hose with a coupling portion.

The branch pipe 51 coupled with the hoses 52 is set in a mold 80 as in the case shown in FIG. 8, and glass-fiber contained polyimide resin is injected into the cavity, thereby forming the resin covering portion 53. The hoses 52 are centripetally pressed with the injection force of the resin covering portion 53 and the shrinking force of it after molded, whereby the hoses are tightly coupled with the branch pipe 51. With this, the second enlarged part 72 is also reduced in diameter to be tightly coupled with the branched pipe 60.

Figure 7:
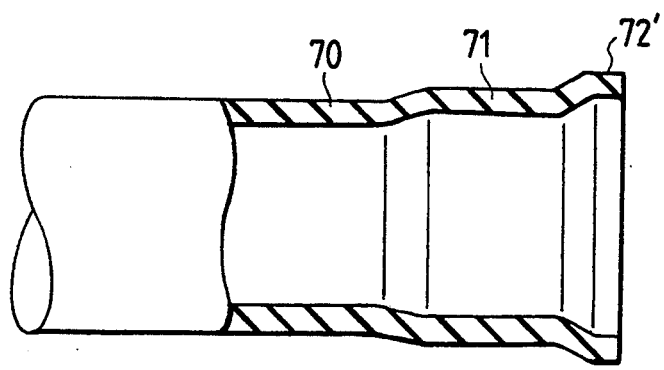
FIG. 7 is a cross sectional view showing another hose with a coupling portion according to a third embodiment of the present invention.

In the hose 52 of the present embodiment, the second enlarged section 72 is expanded in a funnel fashion. Alternatively, the coupling portion of the hose of a third embodiment of the present invention may be formed as shown in FIG. 7 in which the coupling portion includes of a funnel-shaped rear enlarged section gradually expanding in diameter, and a second enlarged section 72' extending in parallel to the first enlarged section 71.

From the foregoing it is apparent that the described embodiments have accomplished the objects of this invention. Other embodiments will occur to those skilled in the art and are encompassed within the scope of the following claims.

What is claimed is:

1. A hose coupling structure comprising:

at least one nipple, at lest one hose having a coupling portion coupled to the nipple, and at least one mold portion covering the coupling portion coupled with the nipple, said mold portion being constructed and arranged to tightly couple the coupling portion with the nipple, said hose including, before being coupled to said nipple:

a general cylindrical part having an inner diameter generally equal to an inner diameter of said nipple;

a first enlarged cylindrical part having an inner diameter enlarged at a fore end of said general cylindrical part, the inner diameter of said first enlarged cylindrical part at a fore end thereof being smaller than an outer diameter of said nipple; and a second enlarged part having an inner diameter which gradually increases starting from said fore end of the first enlarged cylindrical part, said inner diameter of said second enlarged part at a fore end thereof being larger than the outer diameter of the nipple, said first and second enlarged parts defining said coupling portion, whereby, when said coupling portion is coupled to said nipple, said nipple is inserted into said second enlarged part and said outer diameter of said nipple enlarges said inner diameter of said first enlarged cylindrical part thereby providing a sealed coupling between said nipple and said hose, the hose including a reinforcing layer constructed and arranged when under tension to reduce a diameter of said coupling portion when said coupling portion si coupled to said nipple thereby improving a clamping force and a seal between the hose and the nipple.

2. A hose for coupling to a ribbed nipple which has a given inner diameter, an outer facial diameter and an outer rib diameter which is larger than the outer facial diameter, said hose comprising:

a length of tubing including a general cylindrical part having an inner diameter substantially equal to said given inner diameter, and a coupling part;

said coupling part including an enlarged cylindrical part having an enlarged inner diameter at a fore end of said general cylindrical part;

the inner diameter of said enlarged cylindrical part at a fore end thereof being larger than said outer facial diameter of the nipple and smaller than the outer rib diameter of the nipple, whereby, when the nipple is coupled with the coupling part, the outer rib diameter of said nipple enlarges said inner diameter of said enlarged cylindrical part, thereby providing a sealed coupling between said nipple and said hose, the hose including a reinforcing layer constructed and arranged when under tension to reduce diameter of said coupling part when said coupling part is coupled to said nipple thereby improving a clamping force and a seal between the hose and the nipple.

3. A hose as in claim 2, wherein said enlarged cylindrical part includes a first enlarged section having a fore end and a second enlarged section having a fore end which is the said fore end of said enlarged cylindrical part, said first enlarged section being disposed between said general cylindrical part and said second enlarged section and having an inner diameter which is larger than said inner diameter of said general cylindrical part but smaller than the outer rib diameter of the nipple.

4. A hose as in claim 3, wherein said first and second enlarged sections have inner sides which are parallel to each other.

5. A hose as in claim 3 wherein said second enlarged section has an inner side which flares outwardly.

6. A hose for coupling to a ribbed nipple which has d given inner diameter, an outer facial diameter and an outer rib diameter which is larger than the outer facial diameter, said hose comprising:

a length of tubing including a general cylindrical part having an inner diameter substantially equal to the given inner diameter of the nipple, and a coupling part;

said coupling part including an enlarged part having an enlarged inner diameter at a fore end of said general cylindrical part;

the inner diameter of said enlarged part at a fore end thereof being larger than the outer facial diameter of the nipple, said inner diameter of the enlarged part at said fore end thereof being larger than the outer rib diameter of the nipple, said enlarged part including a first enlarged cylindrical section having a fore end and a second enlarged section having a fore end which is the said fore end of said enlarged part, said first enlarged cylindrical section being disposed between said general cylindrical part and said second enlarged section and having an inner diameter which is larger than the inner diameter of said generally cylindrical part but smaller than the outer rib diameter of the nipple, whereby, when said coupling part is coupled to said nipple, said nipple is inserted into said second enlarged section and said outer rib diameter of said nipple enlarges said inner diameter for said first enlarged cylindrical section thereby providing a sealed coupling between said nipple and said hose, the hose including a reinforcing layer constructed and arranged when under tension to reduce a diameter of said coupling part when said coupling part is coupled to said nipple thereby improving a clamping force and a seal between the hose and the nipple.

7. A hose as in claim 6, wherein said first enlarged cylindrical section, and said second enlarged section have inner sides which are parallel to each other.

8. A hose as in claim 6, wherein said second enlarged section has an inner side which flares outwardly.

* * * * *